April 23, 1963

M. E. GROTZ 3,086,619

AUTOMATIC CHOCKING DEVICE

Filed Oct. 7, 1960

Mike Eugen Grotz
INVENTOR.

BY
Attorneys

April 23, 1963
M. E. GROTZ
3,086,619
AUTOMATIC CHOCKING DEVICE
Filed Oct. 7, 1960
5 Sheets-Sheet 2
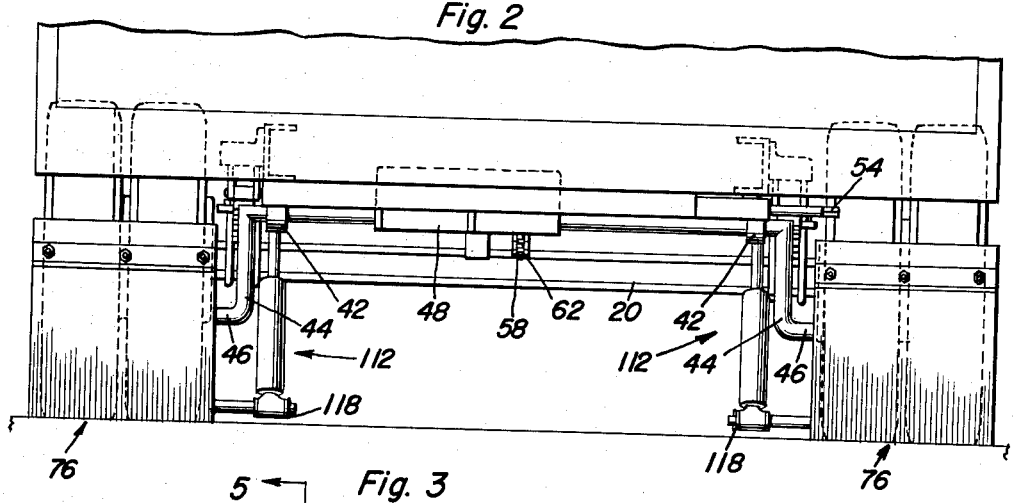
Fig. 2
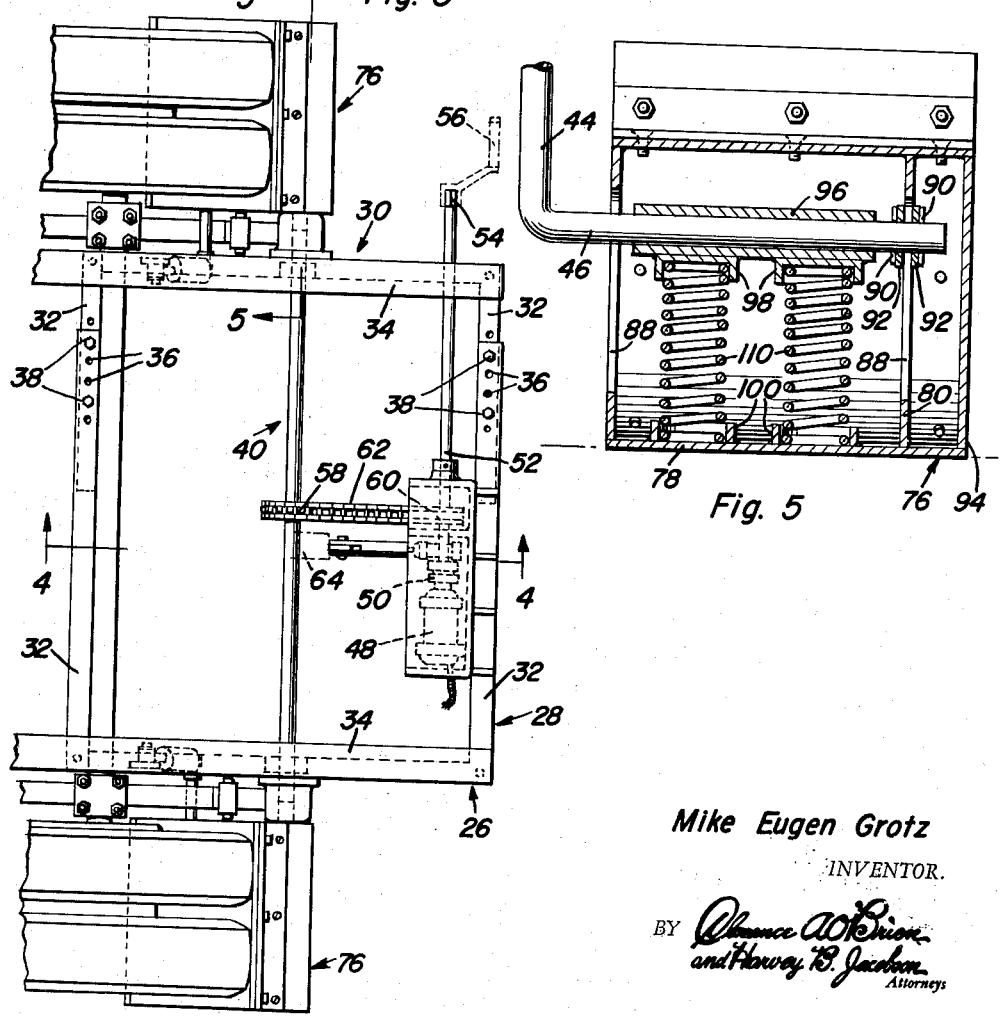
Mike Eugen Grotz
INVENTOR.

April 23, 1963  M. E. GROTZ  3,086,619
AUTOMATIC CHOCKING DEVICE
Filed Oct. 7, 1960

Mike Eugen Grotz
INVENTOR.

April 23, 1963    M. E. GROTZ    3,086,619
AUTOMATIC CHOCKING DEVICE
Filed Oct. 7, 1960    5 Sheets-Sheet 4

Mike Eugen Grotz
INVENTOR.

BY *Clarence A. O'Brien*
*and Harvey B. Jacobson*
Attorneys

April 23, 1963        M. E. GROTZ                3,086,619
                AUTOMATIC CHOCKING DEVICE
Filed Oct. 7, 1960                              5 Sheets-Sheet 5
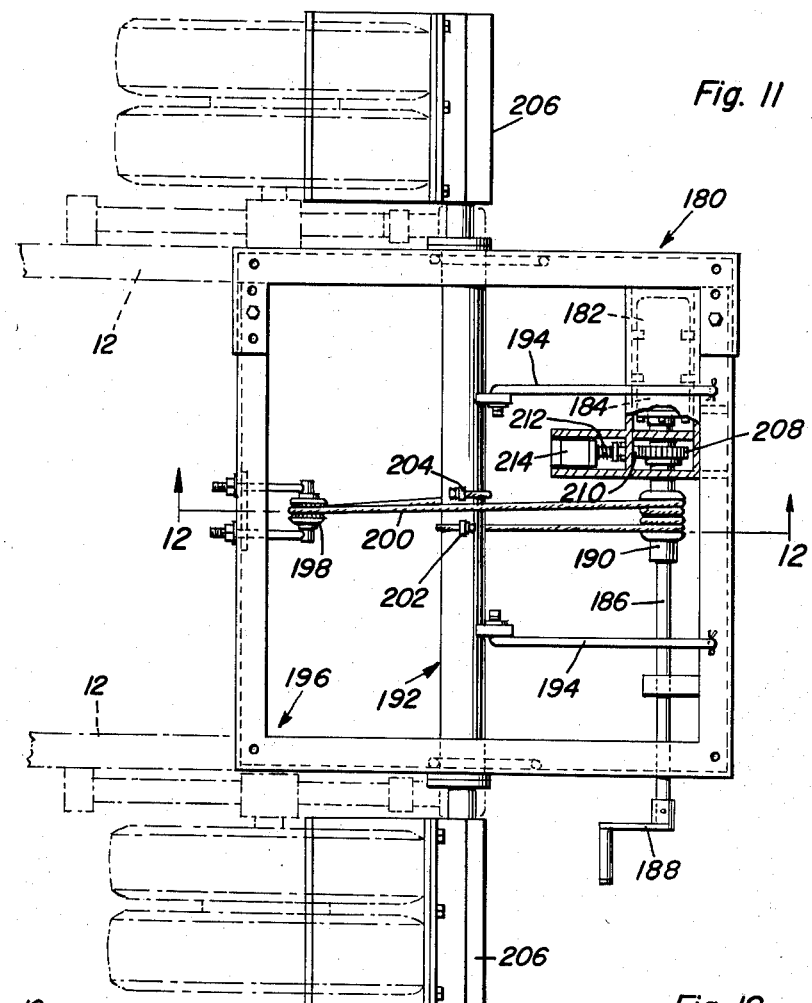
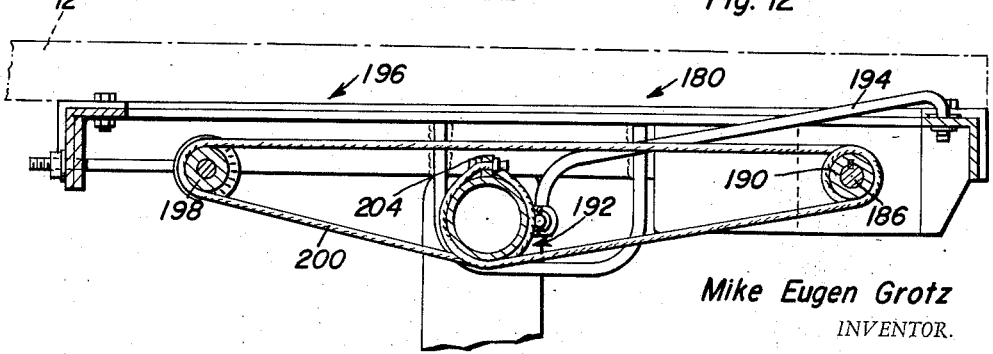
Mike Eugen Grotz
INVENTOR.

ns' default" United States Patent Office 3,086,619
Patented Apr. 23, 1963

3,086,619
AUTOMATIC CHOCKING DEVICE
Mike Eugen Grotz, 48 Swan St., Sheridan, Wyo.
Filed Oct. 7, 1960, Ser. No. 61,172
14 Claims. (Cl. 188—4)

This invention relates to an automatic chocking device for trucks and other vehicles which is specifically adapted to be mounted on the main frame of a truck and for pivotal movement between a lowered operational position and a raised inoperative position. The chocking device includes a wheel chock having a substantially flat lower surface adapted to engage the surface supporting a vehicle and a generally arcuate wheel engaging surface curving upwardly and away from the lower surface and adapted to engage the periphery of a vehicle wheel adjacent the surface by which the wheel is being supported.

The primary object of this invention is to provide an automatic wheel chocking device which may be utilized for chocking the rear wheels of a towing vehicle or large trucks and the like adapted to carry heavy loads in order to prevent rearward movement of the vehicle. In the case of a towing vehicle, the chocking device will prevent the vehicle from being dragged rearwardly as the winch thereon is being used to pull another vehicle, and in the case of a heavily loaded truck, the chocking device will enable the truck to proceed forwardly after stopping on a steep incline.

Many chocking devices have been heretofore designed and most have included the provision of a crankshaft having laterally extending arms whose free ends have secured thereto wheel chocks whereby the wheel chocks may be moved from a raised inoperative position to a lowered operative position upon rotation of the crankshaft. However, in order that a wheel chock mounted in this manner may be moved a sufficient distance rearwardly of the vehicle wheel it is adapted to chock a sufficient distance to provide the necessary clearance for that wheel, the crankshaft must be journaled for rotation about an axis spaced rearwardly of the axis of rotation of the vehicle wheel. In this manner, the wheel chock may then be moved rearwardly of the vehicle wheel as well as vertically relative to the supporting surface of the vehicle as the wheel chock is being moved to an inoperative position. Although the lateral spacing of the wheel chock crankshaft from the axis of rotation of the wheel to be chocked will afford sufficient fore and aft clearance between the wheel chock and the vehicle wheel when the wheel chock is in an inoperative position, because the forward portion or toe of the wheel chock will swing through an arc intersecting the plane containing the supporting surface for the vehicle, a means must be provided for pivotally mounting the wheel chock on the free end of the crank arm. Accordingly, it is a further object of this invention to provide a means for pivotally mounting the wheel chock on the free end of the crankshaft arm.

In order that the wheel chock may not freely pivot on the free end of the crankshaft arm, it is a still further object of this invention to provide an extensible radius arm pivotally secured at one end to the toe of the wheel chock and at the other end to the vehicle frame a spaced distance forwardly of the axis of rotation of the crankshaft whereby the wheel chock may be swung to an inoperative position in a manner to provide sufficient but not excessive fore and aft clearance between the wheel chock it is adapted to chock.

Yet another object of this invention is to provide a means for resiliently mounting the wheel chock to the free end of the crankshaft arm in a manner whereby the wheel chock will be resiliently urged into tight frictional engagement with the supporting surface for the vehicle when the wheel chock is in the lowered operative position.

Yet another object of this invention, in accordance with the immediately preceding object, is to provide a means for resiliently urging the radius arm to an extended position whereby the toe portion of the wheel chock will also be resiliently urged into tight frictional engagement with the supporting surface for the vehicle when the wheel chock is in the lowered position.

Another object of this invention, in accordance with the preceding objects, is to provide a means for mounting the crankshaft for sliding longitudinal movement relative to the vehicle as well as rotational movement so that the axis of rotation of the crankshaft may be moved longitudinally of the vehicle.

A still further object of this invention, in accordance with the immediately preceding object, is to provide a connection between the vehicle frame and the crankshaft for effecting sliding movement of the crankshaft longitudinally of the vehicle in response to rotation of the crankshaft.

An ancillary object of this invention is to provide a means for locking the crankshaft in a position slid forwardly when the wheel chock is in the operative position and slid rearwardly when the wheel chock is in the raised inoperative position.

A final object of this invention is to provide an automatic chocking device which will conform to conventional forms of manufacture, be of simple construction and easy to operate so as to provide a device that will be economically feasible, long lasting and relatively trouble free.

These together with other object and advantages which will become subsequently apparent reside in the details of construction and operation as more fully hereinafter described and claimed, reference being had to the accompanying drawings froming a part hereof, wherein like numerals refer to like parts throughout, and in which:

FIGURE 2 is a rear elevational view of the embodiment shown in FIGURE 1;

FIGURE 3 is a top plan view of the embodiment shown in FIGURES 1 and 2;

FIGURE 5 is an enlarged transverse vertical sectional view taken substantially upon the plane indicated by the section line 5—5 of FIGURE 3;

FIGURE 11 is a further modified form of the invention; and

FIGURE 12 is an enlarged fragmentary vertical sectional view taken substantially upon the plane indicated by the section line 12—12 of FIGURE 11.

Figure 1:
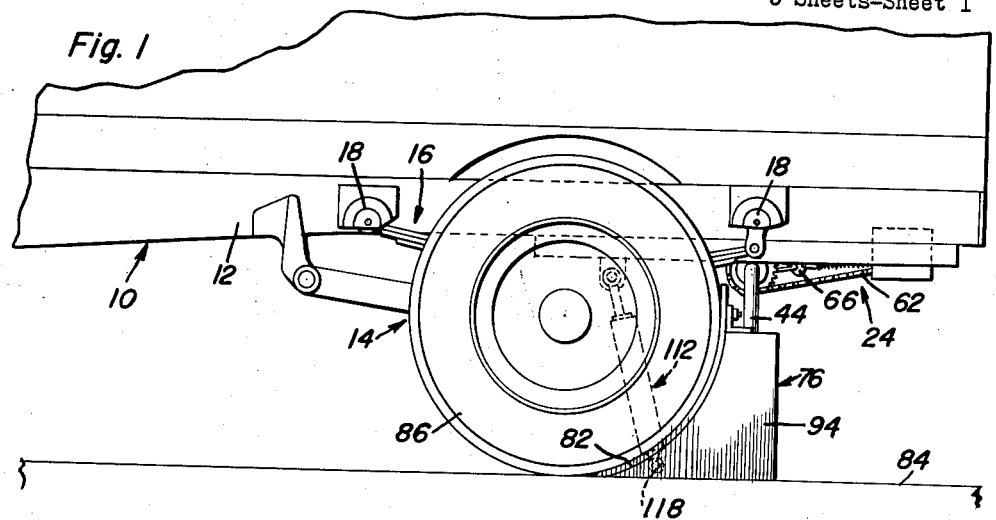
FIGURE 1 is a side elevational view of the automatic chocking device comprising the present invention shown in a lowered operative position.

Referring now more specifically to the drawings, the numeral 10 generally designates a truck including a plurality of longitudinal frame members 12 from which depends a wheeled axle assembly generally referred to by the reference numeral 14. The wheeled axle assembly includes a pair of leaf spring assemblies generally referred to by the reference numeral 16 which are secured between suitable hanger brackets 18. The spring assemblies 16 are secured to opposite end portions of the axle 20 in any convenient manner such as by U-bolt clamp assemblies 22.

One form of the wheel chocking device may be viewed in FIGURES 1 through 5 and is generally referred to by the reference numeral 24. The wheel chocking device 24 includes a mounting frame generally referred to by the reference numeral 26, see FIGURE 3, which includes a pair of U-shaped end sections generally referred to by the reference numerals 28 and 30. Each of the end sections 28 and 30 is generally U-shaped and includes a pair of arms 32 and a bight portion 34. The free ends of the arms 32 are each provided with suitable longitudinally spaced apertures 36 and corresponding ends of the arms 32 are overlapped and secured together by means of suitable fasteners 38. Thus, it may be observed that the mounting frame 26 may be adjusted in width so as to adapt readily to vehicles having longitudinal frame members spaced varying distances apart.

The chocking device 24 includes a crankshaft generally referred to by the reference numeral 40 which is journaled for rotation for movement about an axis extending transversely of the vehicle 10 by means of journal blocks 42 which depend from the bight portions 34. Each end of the crankshaft 40 is provided with a laterally projecting crank arm 44 whose free end portion terminates in a right angulated end portion 46.

A motor means such as electric motor 48 is carried by the mounting frame 26 and has an output shaft (not shown) operatively connected to a speed reduction transmission 50 which in turn has an output or motor shaft 52 extending outwardly therefrom. The output shaft 52 is provided with a non-circular end portion 54 on its free end with which a crank 56 may be engaged in order to effect rotation of the motor shaft 52 in the event of the motor 48 being rendered inoperative.

The crankshaft 40 is provided with a sprocket wheel 58 and the motor shaft 52 is provided with a sprocket wheel 60 aligned with the sprocket wheel 58. An endless chain 62 is entrained about the sprocket wheels 58 and 60 whereby rotation of the crankshaft 40 may be effected by rotation of the motor shaft 52. It is to be noted that the motor 48 may be a conventional electric motor capable of operating from a source of electricity such as that normally carried by the vehicle 10.

The crankshaft 40 is also provided with a laterally projecting radially extending latch member 64 which is engageable by the pivoted keeper arm 66 carried by the keeper assembly generally referred to by the reference numeral 68. The free end of the keeper arm 64 is pivotally connected to a spring urged keeper actuating shaft 70 whose other end comprises a part of the solenoid 72. It is to be noted that the keeper actuating shaft 70 is normally urged to an extended position with the keeper arm 66 engaged with the latch member 64 when the chocking device 24 is in the inoperative position. The solenoid 72 is provided with a suitable electrical conductor 74 by which the solenoid may also be operatively connected with the electrical power source carried by the vehicle 10. In addition, controls for the motor 48 and solenoid 72 may be interconnected in such a manner whereby actuation of the solenoid 72 to retract the keeper arm 66 will also actuate the electric motor 48.

Figure 4:
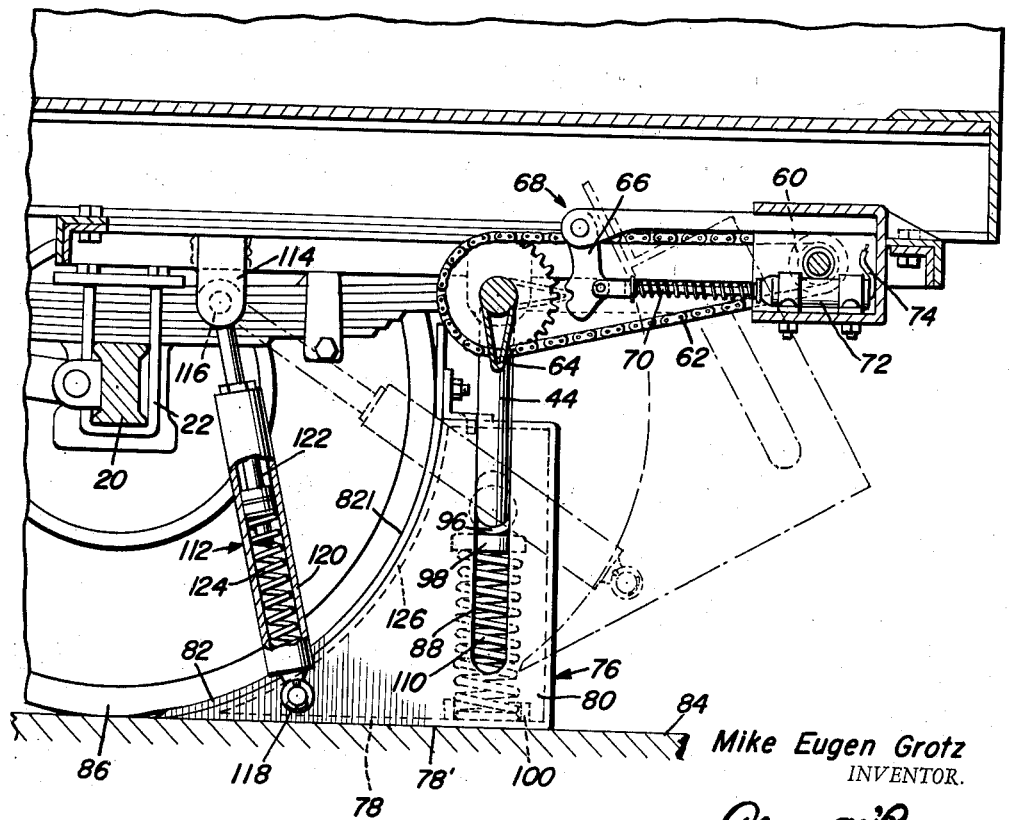
FIGURE 4 is a longitudinal vertical sectional view taken substantially upon the plane indicated by the section line 4—4 of FIGURE 3.
Figure 6:
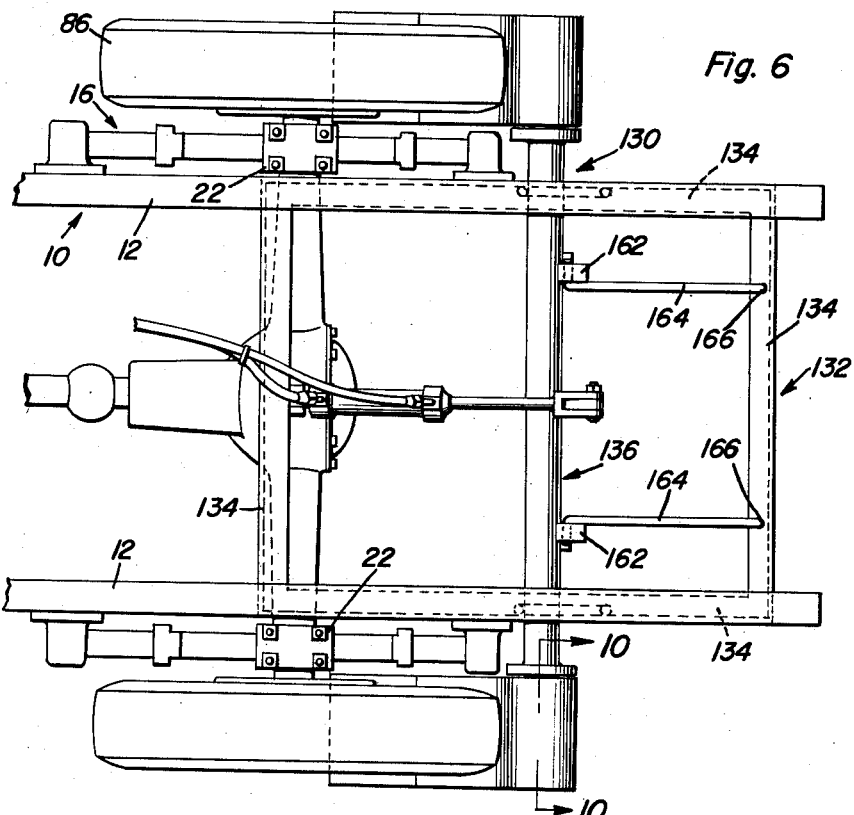
FIGURE 6 is a top plan view of a modified form of the invention.

A wheel chock generally referred to by the reference numeral 76 is carried by the free ends of each of the crank arms 44. Each wheel chock 76 includes a bottom wall 78 and a pair of opposite side walls 80. Each wheel chock 76 also includes an arcuate wheel engaging wall 82 which curves upwardly and away from the forward edge of the bottom wall 78. The bottom wall 78 includes a bottom surface 78' which is substantially flat and is adapted to engage the supporting surface 84 by which the wheels 86 of the vehicle 10 are supported and the wheel engaging wall 82 includes a wheel engaging surface 82' which conforms to and is adapted to engage the lower peripheral surfaces of the wheel 86 adjacent the supporting surface 84 as illustrated in FIGURES 1 and 4 of the drawings.

Each of the side walls 80 is provided with an elongated slot 88 slidingly receiving the corresponding end portion 46 of the crankshaft 40. The terminal end portion of the angulated end portions 46 are each provided with a plurality of diametric bores (not shown) through which retaining pins 90 are secured, see FIGURE 5. A pair of retaining washers 92 are disposed on opposite sides of the outer side wall 80 and between the retaining pins 90 whereby the wheel chocks 76 are each held against longitudinal movement of the corresponding end portion 46 and are slidably mounted thereon for movement toward and away from the axis of rotation of the crankshaft 40. Each of the wheel chocks 76 includes an outer cover side wall 94 for enclosing the outer end of the wheel chocks 76.

Journaled on each end portion 46 is a sleeve 96 provided with a pair of laterally projecting and outwardly opening sockets 98. The bottom wall 78 is provided with a pair of opposing sockets 100 and a pair of compression springs 110 are disposed between pairs of confronting sockets 98 and 100 to resiliently urge the bottom wall 78 away from the end portion 46. In this manner, it will be noted that each wheel chock 76 is rotatably and slidably mounted on the corresponding end portion 46 of the crankshaft 40. An extensible radius arm assembly generally referred to by the reference numeral 112 has one end pivotally secured to a hanger member 114 as at 116 and the other end pivotally secured to the forward or toe portion of each of the wheel chocks 76 as at 118. The radius arm assembly 112 includes a sleeve 120 and a piston 122 with a compression spring 124 being disposed between the head of the piston 122 and the adjacent end of the sleeve 120. In this manner the radius arm assembly 112 is resiliently urged toward an extended position.

The wheel engaging wall 82 of each wheel chock 76 is secured in overlying relation to an inner arcuate wall 126 and may be conveniently constructed of any suitable material for effecting considerable frictional engagement with the wheel 86. Although the wheel engaging wall 82 may be constructed of a metallic material, it may also be constructed of resilient material such as hard rubber.

In operation, assuming that the chocking device 24 is in an elevated position such as illustrated in phantom lines in FIGURE 4 of the drawings, the electric solenoid 72 is actuated to withdraw a keeper arm 66 from engagement with the latch member 64, which actuation of the solenoid 72 will also actuate the electric motor 84 to rotate the crankshaft in a clockwise direction. During the operation of the electric motor 48, the wheel chock 76 is lowered toward the position shown in solid lines in FIGURE 4 of the drawings and as the toe or forward portion of the wheel chock 76 engages the supporting surface 84, the radius arm assembly 112 will contract to enable the toe portion of the wheel chock 76 to pivot upwardly in order that it may be seated on the confronting surfaces of the wheel 76 and the supporting surface 84 immediately adjacent the point at which the wheel 86 is engaged with the supporting surface 84. The electric motor 48 may be provided with an automatic cut-off actuated upon movement of the wheel chock 76 to the lower operative position if desired. In order to then retract the wheel chock 76 the electric motor is actuated to turn in reverse whereupon the crank shaft 40 will rotate counter-clockwise and raise the wheel chock 76. It is to be noted that the slots 88 enable the wheel chock to be swung to an operative position regardless of the weight carried by the vehicle 10 and the flexing of the spring assemblies 16, although the frame 26 is rigidly supported from the frame members 12 of the vehicle 10, inasmuch as the compression springs 110 will compress as the wheel chock 76 engages the supporting surface 84. Upon movement of the wheel chock 76 to its upper retracted position, the latch member 64 will again engage the keeper arm 66 in order that the chock 76 may be retained in the retracted position. As the end portions 46 are swung through an arc upon rotation of the crankshaft 40, the wheel chock will pivot on the end portions 46, although not freely because of the radius arm assemblies 112. Thus, it will be noted that the pivoting of the wheel chocks 76 is guided by the extensible radius arm assemblies 112. In this manner, the wheel chocks 76 may be pivoted to an inoperative position spaced vertically above the supporting surface 84 and rearwardly of the wheel 86. When the wheel chocks 76 are in the elevated inoperative positions, it will be noted that they will function as mud flaps for preventing mud, stones and the like from flying rearwardly off of the wheels 86.

With attention now directed to FIGURES 6 through 10 of the drawings there will be seen a modified form of chocking device generally referred to by the reference numeral 130 which corresponds to the chocking device 24 in many respects. The identical components of the wheel chocking device 130 have been referred to by the same numerals as the corresponding parts of the chocking device. The mounting frame of the chocking device 130 is however not of the extensible type and is generally referred to by the reference numeral 130 and includes four side angle members 134 secured together at adjoining end portions in any convenient manner such as by welding. The crankshaft is generally cylindrical and referred to in general by the reference numeral 136 and journaled for rotation and mounted for sliding movement longitudinally of the frame members 112 by means of U-shaped bracket members generally referred to by the reference numeral 138. The U-shaped bracket members 138 depend from the corresponding side member 134 and rotatably and slidably receive the corresponding end portion of the crankshaft 136.

The crank arms of the crankshaft 136 are designated by the reference numeral 140 and are provided with angulated end portions 142 similar to end portions 46. The wheel chock 76' is substantially the same as wheel chock 76 except that it is more narrow in width and includes a sleeve 96' having only one downwardly opening socket 98' with the bottom wall 78' also being provided with only one socket which is referred to by the reference numeral 100'. A single compression spring 110' is disposed between the confronting sockets 98' and 100'.

Figure 7:
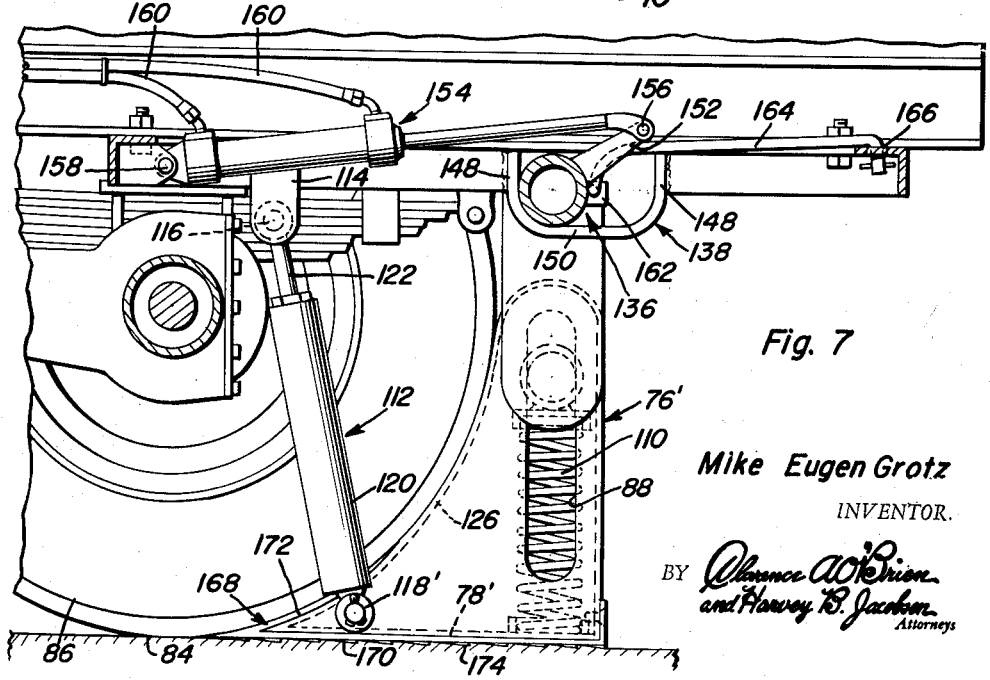
FIGURE 7 is an enlarged longitudinal vertical sectional view of the modified form of chocking device illustrated in FIGURE 6.
Figure 8:
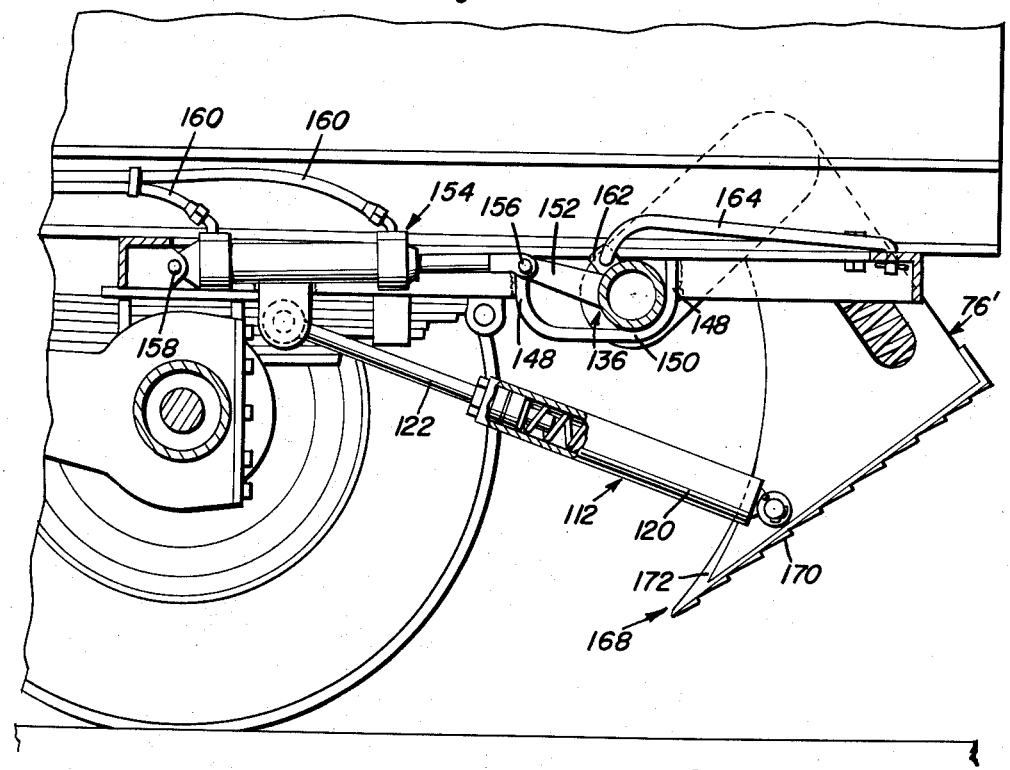
FIGURE 8 is a vertical sectional view similar to that of FIGURE 7 but showing the wheel chock in an elevated inoperative position.
Figure 10:
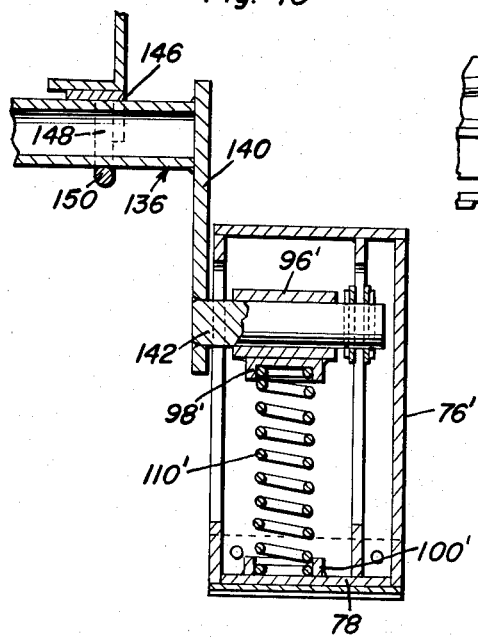
FIGURE 10 is an enlarged transverse vertical sectional view taken substantially upon the plane indicated by the section line 10—10 of FIGURE 6.
Figure 9:
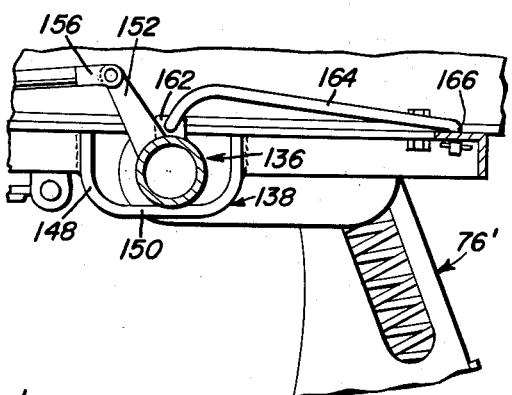
FIGURE 9 is a fragmentary vertical sectional view similar to a portion of FIGURE 8 but showing a crankshaft in a different rotated position.

The U-shaped bracket members 138 each includes a mounting plate 146 to which the free ends of the legs 148 are secured in any convenient manner such as by welding. The legs 148 are interconnected at their lower ends by means of a bight portion 150 which includes a substantially straight center portion generally paralleling the mounting plate 146 and a pair of upwardly curving end portions generally conforming to the cross-sectional outline of the crankshaft 136. The crankshaft 136 is provided with a center crank arm 152 which projects laterally and radially therefrom and has one end of an extensible fluid motor assembly generally referred to by the reference numeral 154 pivoted thereto as at 156. The other end of the extensible fluid motor is pivotally secured to the forward portion of the mounting frame 132 as at 158. The fluid motor 154 is provided with suitable fluid pressure lines 160 by which the fluid motor 154 may be extended and retracted by means of a suitable control (not shown). The crankshaft 136 is also provided with a pair of laterally projecting and radially extending guide lugs 162 which are apertured and have the forward ends of a pair of radius rods 164 pivotally secured thereto. The rear ends of the radius rods 164 are secured to the rear end of the mounting frame 132 as at 166. It will thus be noted that contraction of the fluid motor 154 as illustrated in FIGURE 7 of the drawings will effect counter-clockwise rotation of the axle 136 while at the same time effecting rearward sliding movement of the axle 136 longitudinally of the frame members 12 to the position illustrated in FIGURE 8 of the drawings. The operation of the chocking device 130 is substantially similar to that of the chocking device 24 with the exception that the extensible fluid motor 154 is provided in place of the electric motor 48 and its associated driving and latching components. However, the wheel chock 76', as may be the wheel chock 76, is provided with a shoe generally referred to by the reference numeral 168 having a base portion 170 and an arcuate arm portion 172. The base portion 170 underlies the bottom wall 78' and the arcuate arm portion 174 overlies the inner front arcuate wall 126' adjacent the lower wall 178'. The base portion is provided with any roughened undersurface 174 for providing greater frictional engagement with the supporting surface 84.

With attention now directed more particularly to FIGURES 11 and 12 of the drawings, it will be seen a still further modified form of the chocking device generally referred to by the reference numeral 180 which operates on the same principles as the chocking device 130 but has as its power source an electric motor 182. The electric motor 182 is provided with an output shaft (not shown) engaged with the speed reduction transmission 184 which includes an output or motor shaft 186. The motor shaft 186 is quite similar to the motor shaft 52 and is provided with a crank 188 on the free end thereof. However, the motor shaft 188 is provided with a winding drum 190 for a purpose to be hereinafter more fully set forth. The crankshaft 192 is very similar to the crankshaft 136 and also includes radius rods which are referred to by the reference numeral 194 and function in the same manner as radius rods 164. The forward end of the mounting frame 196 of the chocking device 180 has a pulley 198 mounted thereon for rotation about an axis generally paralleling the axis of rotation of the crankshaft 192 and for adjustable movement longitudinally of the vehicle frame members 12. A flexible member 200 has one end portion wound in one direction about the crankshaft 192 and secured to the outer periphery thereof by means of a suitable clamp 202 and the other end of the flexible member 200 is passed several times around the winding drum 190, entrained about the pulley 198, and passed around the crankshaft 192 in the opposite direction and secured to the outer peripheral surfaces thereof by means of any suitable clamp member 204.

It is believed apparent that the endless member 202 will not only effect rotation of the crankshaft 192 upon rotation of the motor shaft 186 but will also assist the radius rods 194 in effecting longitudinal sliding movement of the crankshaft 192. The wheel chocks 206 of the chocking device 180 may be constructed in a manner similar to the wheel chocks 76 and the motor shaft 186 is provided with a ratchet wheel 208 into which a ratchet dog 210 is resiliently engaged by means of compression spring 212 carried by the solenoid assembly 214. It is to be noted that operation of the electric motor 182 may effect actuation of the electric solenoid 114 to retract the ratchet dog 110 from engagement with the ratchet wheel 208 enabling the motor shaft 186 to rotate. The electric solenoid 214 may be provided with controls actuated by the electric motor 182 to retract the ratchet dog 110 upon operation of the electric motor 182 in either direction. Further, the embodiment illustrated in FIGURES 11 and 12 is also provided with radius arms (not shown) similar to radius arms 112.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle including a longitudinally extending frame, a wheel chocking device comprising a crankshaft having at least one laterally projecting arm fixed thereto, means mounting said crankshaft from said frame for rotation about its longitudinal axis with said axis extending transversely of said frame, a wedge-shaped wheel chock including major and minor end portions, means pivotally mounting the major end portion of said wheel chock to the outer end of said arm for rotation about an axis generally paralleling the axis of rotation of said crankshaft, said wheel chock including a bottom surface adapted to engage the supporting surface for said vehicle and a wheel engaging surface adapted to engage a portion of the periphery of a support wheel of said vehicle adjacent said supporting surface, said pivotal mounting means including means mounting the outer end of said arm for sliding movement relative to said chock toward and away from said bottom surface and means resiliently urging said bottom surface away from said outer end of said arm, means for effecting rotation of said crankshaft to raise and lower said chock relative to said supporting surface, an elongated radius arm variable in length between two limit positions, means pivotally securing one end of said radius arm to the minor end portion of said chock, and means pivotally securing the other end of said radius arm to said vehicle a spaced distance longitudinally thereof from the axis of rotation of said crankshaft, said radius arm including means for resiliently urging said radius arm toward an extended position.

2. The combination of claim 1 including latch means for releasably retaining said crankshaft in a position with said chock raised above said supporting surface.

3. In combination with a vehicle including a longitudinally extending frame, a wheel chocking device comprising a crankshaft having at least one laterally projecting arm fixed thereto, means mounting said crankshaft from said frame for rotation about its longitudinal axis with said axis extending transversely of said frame, a wedge-shaped wheel chock including major and minor end portions, means pivotally mounting the major end portion of said wheel chock to the outer end of said arm for rotation about an axis generally paralleling the axis of rotation of said crankshaft, said wheel chock including a bottom surface adapted to engage the supporting surface for said vehicle and a wheel engaging surface adapted to engage a portion of the periphery of a support wheel of said vehicle adjacent said supporting surface, said pivotal mounting means including means mounting the outer end of said arm for sliding movement relative to said chock toward and away from said bottom surface and means resiliently urging said bottom surface away from said outer end of said arm, means for effecting rotation of said crankshaft to raise and lower said chock relative to said supporting surface, an elongated radius arm variable in length between two limit positions, means pivotally securing one end of said radius arm to the minor end portion of said chock, and means pivotally securing the other end of said radius arm to said vehicle a spaced distance longitudinally thereof from the axis of rotation of said crankshaft, said crankshaft mounting means including means slidably mounting said crankshaft for movement longitudinally of said vehicle.

4. The combination of claim 1 wherein said crankshaft mounting means includes a mounting frame adapted to be secured to the frame of a vehicle.

5. The combination of claim 4 wherein said means slidably mounting said crankshaft includes means interconnecting said crankshaft and said vehicle for effecting sliding movement of said crankshaft in direct response to rotation of said crankshaft.

6. The combination of claim 1 wherein said wheel engaging surface is arcuate and curves upwardly and away from said bottom surface.

7. The combination of claim 6 including a shoe for said chock having a base portion and an arcuate arm portion, means removably securing said shoe to said chock with said base underlying said base and said arm overlying a portion of said arcuate wheel engaging surface adjacent said lower surface.

8. In combination with a vehicle including a longitudinally extending frame, a wheel chocking device comprising a crankshaft having at least one laterally projecting arm fixed thereto, means mounting said crankshaft from said frame for rotation about its longitudinal axis with said axis extending transversely of said frame, a wedge-shaped wheel chock including major and minor end portions, means pivotally mounting the major end portion of said wheel chock to the outer end of said arm for rotation about an axis generally paralleling the axis of rotation of said crankshaft, said wheel chock including a bottom surface adapted to engage the supporting surface for said vehicle and a wheel engaging surface adapted to engage a portion of the periphery of a support wheel of said vehicle adjacent said supporting surface, said pivotal mounting means including means mounting the outer end of said arm for sliding movement relative to said chock toward and away from said bottom surface and means resiliently urging said bottom surface away from said outer end of said arm, means for effecting rotation of said crankshaft to raise and lower said chock relative to said supporting surface, an elongated radius arm variable in length between two limit positions, means pivotally securing one end of said radius arm to the minor end portion of said chock, and means pivotally securing the other end of said radius arm to said vehicle a spaced distance longitudinally thereof from the axis of rotation of said crankshaft, said crankshaft mounting means including means slidably mounting said crankshaft for movement longitudinally of said vehicle, said crankshaft mounting means including a mounting frame secured to the frame of a vehicle, said means slidably mounting said crankshaft including means effecting sliding movement of said crankshaft in response to rotation of the latter, including a pair of radius rods, means pivotally securing one set of corresponding ends of said rods to said mounting frame and means pivotally mounting the other corresponding ends of said radius rods to said crankshaft for rotation about axes paralleling and spaced laterally from the axis of rotation of said crankshaft.

9. The combination of claim 1 wherein said means for effecting rotation of said crankshaft includes an electric motor drivenly connected thereto.

10. The combination of claim 1 wherein said means effecting rotation of said crankshaft comprises an extensible motor having one end adapted to be pivotally secured to said vehicle, means pivotally and eccentrically securing the other end of said extensible motor to said crankshaft.

11. In combination with a vehicle including a longitudinally extending frame, a wheel chocking device comprising a crankshaft having at least one laterally projecting arm fixed thereto, means mounting said crankshaft from said frame for rotation about its longitudinal axis with said axis extending transversely of said frame, a wedge-shaped wheel chock including major and minor end portions, means pivotally mounting the major end portion of said wheel chock to the outer end of said arm for rotation about an axis generally paralleling the axis of rotation of said crankshaft, said wheel chock including a bottom surface adapted to engage the supporting surface for said vehicle and a wheel engaging surface adapted to engage a portion of the periphery of a support wheel of said vehicle adjacent said supporting surface, said pivotal mounting means including means mounting the outer end of said arm for sliding movement relative to said chock toward and away from said bottom surface and means resiliently urging said bottom surface away from said outer end of said arm, means for effecting rotation of said crankshaft to raise and lower said chock relative to said supporting surface, an elongated radius arm variable in length between two limit positions, means pivotally securing one end of said radius arm to the minor end portion of said chock, and means pivotally securing the other end of said radius arm to said vehicle a spaced distance longitudinally thereof from the axis of rotation of said crankshaft, said crankshaft mounting means including means slidably mounting said crankshaft for movement longitudinally of said vehicle, said crankshaft mounting means including a mounting frame secured to the frame of said vehicle, said means effecting rotation of said crankshaft including a motor shaft journalled in said frame for rotation about an axis generally paralleling the axis of rotation of said crankshaft on one side thereof, a pulley means mounting said pulley for rotation about an axis generally paralleling the axis of rotation of said crankshaft on the other side thereof, an endless flexible member entrained about said pulley and having one end wound about said crankshaft in one direction and fixedly secured to the outer surface thereof and the other end wound about said motor shaft and wound about said crankshaft in the other direction and secured to the outer surface thereof.

12. The combination of claim 1 wherein said chock includes a pair of opposite side walls interconnecting bottom and wheel engaging walls including said bottom and wheel engaging surfaces respectively, said side walls each including a slot extending substantially perpendicular to said bottom wall, said pivotal mounting means including a laterally directed end portion on the free end of said crank arm slidably disposed in said slots, a mounting sleeve journalled on said end portion between said side walls, said resilient urging means comprising at least one compression spring disposed between the confronting surfaces of said mounting sleeve and bottom wall.

13. The combination of claim 11 wherein said pulley mounting means includes means for adjustably positioning said pulley toward and away from said crankshaft.

14. The combination of claim 1 wherein said crankshaft mounting means includes a mounting frame secured to the frame of a vehicle, said mounting frame including adjustable sections for varying the width thereof in order to compensate for vehicles having varying distances between their longitudinal main frame members.

References Cited in the file of this patent

UNITED STATES PATENTS

| | | |
|---|---|---|
| 781,782 | McGrew et al. | Feb. 7, 1905 |
| 850,302 | Greaser et al. | Apr. 16, 1907 |
| 1,653,420 | Koolbergen | Dec. 20, 1927 |
| 1,773,762 | Strano | Aug. 26, 1930 |
| 2,645,309 | Grotz | July 14, 1953 |
| 2,718,283 | Ropp | Sept. 20, 1955 |

FOREIGN PATENTS

| | | |
|---|---|---|
| 5,204 of 1908 | Great Britain | Mar. 7, 1908 |
| 302,421 | Great Britain | Dec. 20, 1928 |